United States Patent [19]

Mulcahy

[11] Patent Number: 4,521,453

[45] Date of Patent: Jun. 4, 1985

[54] HEATING/COOLING COIL SEALING

[75] Inventor: Kieran Mulcahy, Kildare, Ireland

[73] Assignee: Loctite (Ireland) Ltd., Dublin, Ireland

[21] Appl. No.: 574,500

[22] Filed: Jan. 27, 1984

[51] Int. Cl.³ .................... B32B 35/00; B05D 3/02
[52] U.S. Cl. .................... 427/140; 427/142; 427/388.2; 427/239
[58] Field of Search ........... 427/140, 142, 235, 238, 427/239, 295, 388.2

[56] References Cited

U.S. PATENT DOCUMENTS

| | | | |
|---|---|---|---|
| 4,026,976 | 5/1977 | Anderson | 427/142 X |
| 4,147,821 | 4/1979 | Young | 427/295 |
| 4,165,400 | 8/1979 | DeMarco | 427/388.2 |
| 4,311,735 | 1/1982 | Young | 427/295 |
| 4,416,921 | 11/1983 | Dunn | 427/388.2 |
| 4,419,163 | 12/1983 | Yamamoto et al. | 427/142 X |

*Primary Examiner*—Thurman K. Page
*Attorney, Agent, or Firm*—Walter J. Steinkraus; Eugene F. Miller

[57] ABSTRACT

A method of sealing a porous heating or cooling jacket of a reactor vessel includes the steps of: (a) draining the heating or cooling fluid from jacket; (b) washing and drying the interior of the jacket; (c) filling the jacket with a curable liquid sealant composition under pressure sufficient to cause the composition to permeate the porous areas in the jacket but insufficient to burst the jacket, the composition being curable at temperatures between about 75° C. and 100° C.; (d) draining the sealant from the jacket; and (e) heating the jacket to or above the cure temperature of the composition and maintaining that temperature for sufficient time to ensure total polymerization of the reactant composition.

10 Claims, 3 Drawing Figures

HEATING/COOLING COIL SEALING

BACKGROUND OF THE INVENTION

This invention relates to a process for sealing heating or cooling jackets on industrial processing tanks such as fermentation vessels used in breweries.

Metal processing tanks having heating/or cooling jackets are widely used in chemical, food, pharmaceutical and related industries for batch heating or cooling duties. Typically the cooling jacket will comprise one or more conduits encirculating the tank through which a heating or cooling fluid is circulated. It is common for the jacket to be welded to the tank, sometimes using the outer tank wall as the inner jacket wall. Such welds are also particularly sensitive to the corrosive action of heating or cooling fluids so that they often develop leaks during the surface life of the vessel. Such leaks can cause a number of problems ranging from merely cosmetic to serious damage to surrounding structures and loss of heating or cooling capability.

Heretofore, when such leaks developed it was necessary to attempt to reseal the vessel by rewelding the leaking areas and, if unsuccessful, to rebuild or discard the vessel. Such repairs, even if successful, were extremely expensive, particularly in situations where the tank is lagged with an insulating material and/or the space around the installed vessel is small.

It is known to impregnate porous articles of metal with various materials including acrylic monomer compositions. It is customary in such applications to place the porous articles and the composition in a tank from which the air above the composition is subsequently evacuated. This removes most of the air from the pores of the articles. Normal pressure is restored with the articles submerged in the composition. This drives the composition into the pores. Articles are then removed from the tank and allowed to cure anaerobically or under the influence of heat.

Anaerobic, self-emulsifiable impregnants useful in such applications are described in U.S. Pat. No. 4,165,400 to DeMarco. It is also known to use such compositions to seal automobile engine blocks by injecting the impregnant into interior cavities of the block under pressure.

In U.S. Pat. No. 4,416,921, to Dunn et al., the disclosure of which is incorporated herein by reference, there are described metal insensitive heat curing impregnant compositions comprising: (a) an azonitrile; (b) a polymerizable acrylic compound; (c) a sterically-hindered substituted phenol stabilizer; and (d) a metal ion chelator. Such compositions can be easily cured at temperatures in the range of 75°–90° C.

In U.S. Pat. No. 4,147,821 to Young, there are described other acrylic impregnants which may be heat cured at temperatures below 100° C. It is also known to use styrene based polyester monomer impregnants which are heat cured at temperatures of 120°–150° C.

SUMMARY OF THE INVENTION

The invention is a novel application of impregnant compositions which may be cured by heat at temperatures below 100° C. The invention is a method of sealing a porous heating or cooling jacket of a reactor vessel which includes the steps of: (a) draining the heating or cooling fluid from jacket; (b) washing and drying the interior of the jacket; (c) filling the jacket with a curable liquid sealant composition under pressure sufficient to cause the composition to permeate the porous areas in the jacket but insufficient to burst the jacket, the composition being curable at temperatures between about 75° C. and 100° C., (d) draining the sealant from the jacket; and (e) heating the jacket to or above the cure temperature of the composition and maintaining that temperature for sufficient time to ensure total polymerization of the reactant composition.

DETAILED DESCRIPTION OF THE INVENTION

The invention may be illustrated by reference to a specific industrial example.

Figure 1:
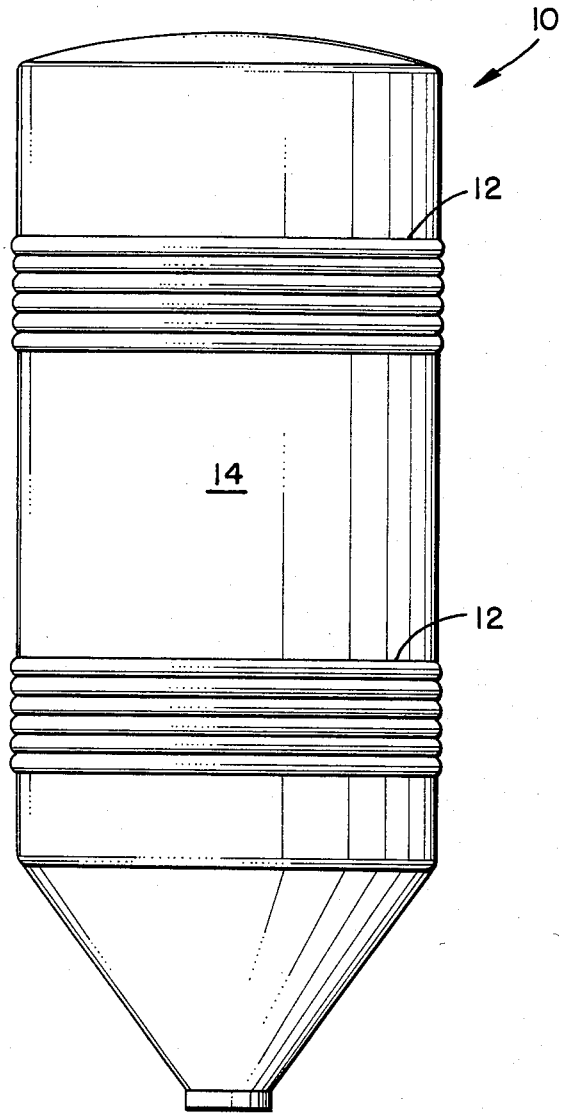
FIG. 1 is a side elevational view of a Nathan-type fermentation vessel or tank having a pair of coil type cooling jackets on the outer surface thereof.

A brewery utilized 39 80,000 liter capacity, 12-foot diameter, 33-foot high, Nathan-type fermentation vessels as illustrated in FIG. 1 and designated by the numeral 10. Each vessel was equipped with two coil-type cooling jackets 12 and circulating the outer walls 14 of vessel 10. The vessels were spaced as close as 14 feet center to center and each was lagged with approximately 4 inches of wall fiber insulation (not shown). An alcohol-water coolant circulated in jackets 14 to attemporate beer at temperatures close to ambient during the fermentation process.

Figure 2:
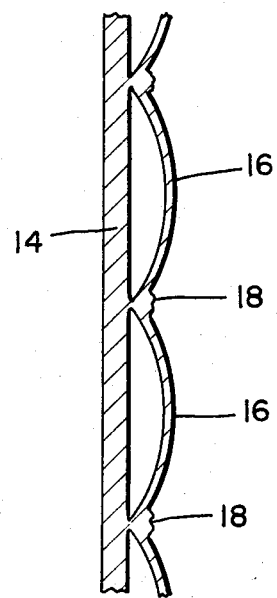
FIG. 2 is a cut-away elevational view of a portion of the tank wall showing tank wall/cooling coil joints.

FIG. 2 illustrates a cut away portion of the tank wall showing the outer coil walls 16 welded at beads 18 to each other and to vessel walls 14.

After twelve years of service, it became evident that the cooling jackets were leaking. Though the leaks were not severe enough to affect the attemporation significantly, significant deterioration of ceiling materials in the drawoff cone area had occurred as a result of coolant leakage.

A conventional solution to this problem would have been to reweld each jacket. This would have required that the cladding and lagging be removed. Furthermore, a metallurgical analysis of tank sections suggested that the well damage was so severe that rewelding might not be an effective solution to the problem.

Sections of welded coil/tank joints were cut out of one of the tanks and the joints subjected to scanning electron microscope (SEM) and microscopic analysis. The analysis revealed corrosion cavities in the weld beads and scale material which was confirmed as typical corrosion products such as iron and other metal salts.

The cut-out portion of the sample tank was replaced and the tanks were subjected to the following steps:

(1) Wash and dry the jackets using water and compressed air, respectively. This ensures sealant penetration of water-free porous areas. The simple cleaning will help to remove loose scale inside the jackets.

(2) Pump in the sealant, described below, and pressurize the jacket. This causes the sealant to penetrate the encrusted scale and permeate the porous areas. The jacket was filled from the bottom. Pressure was maintained at 45 plus or minus 5 psi for 4 hours.

(3) Atmospheric pressure was restored and excess liquid sealant drained under gravity. Sealant was filtered to remove any scale contamination and stored for reuse.

(4) The sealant in the jacket was cured by rapidly heating to above 80° C. This was done by adding hot water and steam to the reactor vessel so that the heat was transferred into the jacket. Heating began within 15 minutes draining and temperature reached 80° C. within 20 minutes after heating began. The temperature was maintained for sufficient time to ensure copolymerization of the liquid. In this case, 60 minutes at 85° C.

(5) The jacket was allowed to cool overnight and pressure tested to check the effectiveness of the sealing operation. If significant pressure loss still occurred, the sealing process could be repeated.

The sealant employed was a metal insensitive, heat cured acrylic of the type disclosed in U.S. Pat. No. 4,416,921, modified by addition of about 5% of a nonionic surfactant as disclosed in U.S. Pat. No. 4,165,400 to DeMarco. The monomers utilized were a blend of triethylene glycol dimethacrylate, ethoxylated bisphenol A dimethacrylate and lauryl methacrylate. The monomers were selected to give a low viscosity (about 9 cps), capable of penetrating the smallest leaks in the systems under the pressures utilized and of curing rapidly to polymer with good resistance to the alcohol/water coolant used in the fermentation vessel jackets. Surfactant was added to the formulation to improve wetting characteristics to assist sealant penetration into scale and pores.

Pressurized water was supplied to the jacket of a typical fermentation vessel and plots of pressure versus time were obtained before and after the sealing treatment. Prior to sealing the water pressure dropped from 45 psi to less than 10 psi in 90 minutes. After sealing there was no measurable drop after the 90-minute period. Even after 72 hours, the pressure remained above 40 psi. This test demonstrated the significant improvement in the pressure tightness of the jackets obtained by the inventive method. By comparison, it was noted during the sealing operation on the initial vessel, that the fresh welds in the replacement section, referred to above, showed some evidence of sealant leakage through the fresh welds during the sealing process. This confirmed that total rewelding of the jackets would have been less than 100% effective.

Figure 3:
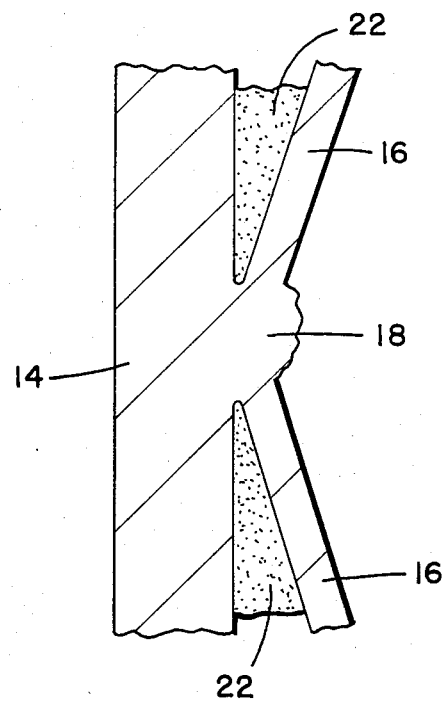
FIG. 3 is a cut-away view of a single tank wall/cooling coil joint after treatment with the inventive method.

Sections, including a tank/coil welded joint were cut from a sealed vessel and examined under a microscope. FIG. 3 is a representation of one such section. The figure shows that a composite 22 of scale and resin was formed, sealing the joint.

The resistance of the cured sealant to the alcohol/water solvent was demonstrated by solvent aging tests of cured sealant slugs and lap joint bonds.

Cured sealant slugs (10 mm×4 mm diameter) were aged in the coolant for up to eight weeks at 5°, 25° and 80° C. In all cases the slugs remained intact and undamaged.

Adhesion to metal is measured as relative tensile shear strength of lap shear joints. The following results were found after four weeks aging of various steel bonds in the alcohol/water coolant.

These results further confirm the excellent solvent resistance and metal adhesion of the cured sealant.

In addition to the monomers used in the foregoing examples, other acrylic monomers may be employed in sealant compositions useful in the practice of the inventive method. For instance, cyclohexyl methacrylate, polyethylene glycol dimethacrylate and tetrahydrofurfuryl methacrylate are other recommended monomers. Acrylate analogs of any of the foregoing methacrylate esters may also be usefully employed. Other useful monomers may occur to those familiar with formulations of impregnation compositions. Formulations of the type disclosed in U.S. Pat. No. 4,416,921 are especially useful because their metal insensitivity makes reuse, after filtration, of drained sealant practical.

Although the described acrylic systems are much preferred, other compositions curable under mild heat, such as epoxies, may also be useful in the inventive process. In general, however, the cured composition should be characterized by a viscosity low enough to permit the jacket porous areas to be penetrated at pressures below the burst strength of the jacket to allow the composition to be easily drained from the jacket. If inadequately drained, a heavy layer of polymer coating the interior walls of the jacket could result and reduce the heat transfer capability of the jacket.

Typically the upper practical range of viscosity is about 100 cps. Preferably viscosity will be below about 30 cps, still more preferably below 15 cps.

For optimal pore penetration it is preferred that the curable composition have a minimum surface tension of 20 dynes/cm, preferably about 25 dynes/cm or higher. These surface tensions can be readily achieved by inclusion of surfactants in the composition.

In the practice of the inventive method, it is recommended that a pressure/time profile be first established for a representative vessel. To obtain the profile, a sealing pressure substantially below the burst strength of the jacket is selected and a liquid such as water pumped into the jacket at that pressure while observing the outside of the jacket. The time required for the liquid to appear at the smaller leak sites is ascertained, thereby providing the minimum time for the sealant pressure to be maintained. Appropriate additions to that minimum time should be made to account for differences in viscosity and surface tension of the sealant and the test liquid and for variations between vessels.

I claim:

1. A method of sealing a porosities in a corroded heating or cooling jacket of a reactor vessel, the method comprising:
   (a) draining the heating or cooling fluid from said jacket;
   (b) washing and drying the interior of said jacket;
   (c) filling the jacket with a curable liquid sealant composition under pressure sufficient to cause the composition to permeate the porous areas in the jacket, but insufficient to burst the jacket, said composition being curable at temperatures between about 75° C. and 100° C. and having viscosity and surface tension properties which permit the jacket porous areas to be penetrated at pressures below the burst strength of the jacket;
   (d) draining excess sealant from the jacket; and
   (e) heating the jacket to or above the cure temperature of the composition and maintaining that temperature for sufficient time to ensure total polymerization of the reactive liquid.

2. A method as in claim 1 wherein the curable composition comprises at least one acrylic monomer, a surfactant and a cure system comprising an azonitrile, a metal chelator and a hindered phenol.

3. A method as in claim 2 wherein the acrylic monomer component of said composition comprises at least one member of the group consisting of triethylene glycol dimethacrylate, triethylene glycol diacrylate, lauryl methacrylate, lauryl acrylate, ethoxylated bisphenol A dimethacrylate, ethoxylated bisphenol A diacrylate, cyclohexyl methacrylate, cyclohexyl acrylate, polyethylene glycol dimethacrylate, polyethylene glycol diacrylate, tetrahydrofurfuryl methacrylate, and tetrahydrofurfuryl acrylate.

4. A method as in claim 1 wherein the curable composition has a viscosity below 100 cps.

5. A method as in claim 1 wherein the curable composition has a viscosity below about 30 cps.

6. A method as in claim 1 wherein the curable composition has a viscosity below about 15 cps.

7. A method as in claim 1 wherein the curable composition has a surface tension above 20 dynes/cm.

8. A method as in claim 1 wherein the curable composition has a surface tension above about 25 dynes/cm.

9. A method as in claim 1 wherein said heating step is performed by filling the reactor vessel with hot water and/or steam.

10. A method as in claim 1 further comprising pressure testing the jacket after completion of the sealing operation and repeating said steps (a) through (e) if significant pressure loss remains.

* * * * *